July 23, 1963     I. JEPSON     3,098,921
COMPOSITE ELECTRICALLY HEATED DEVICES
Filed July 10, 1957     2 Sheets-Sheet 1
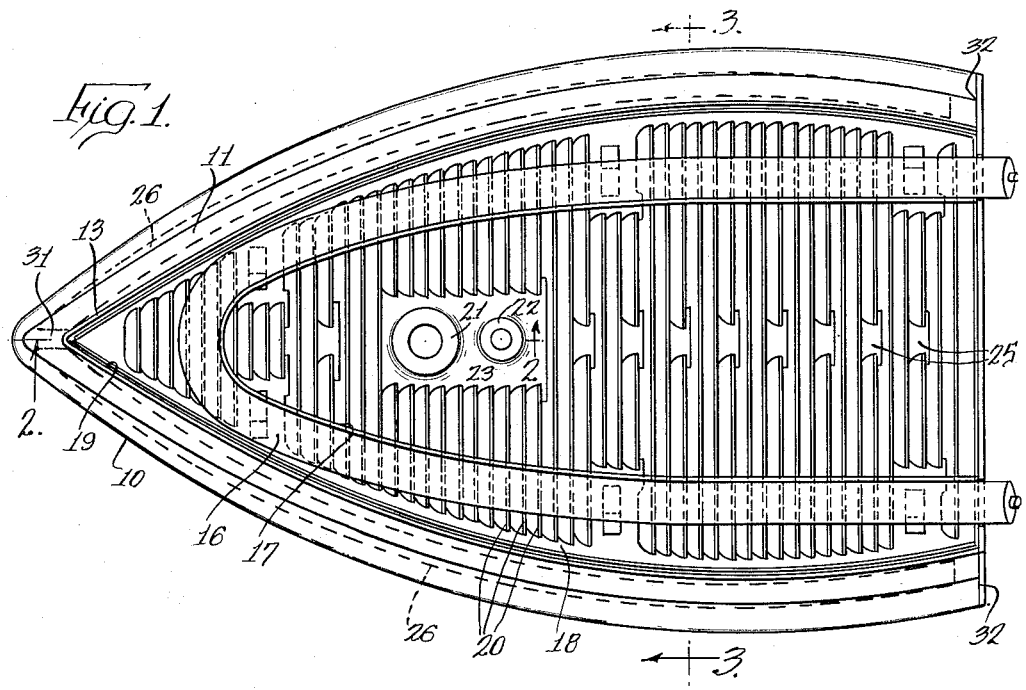
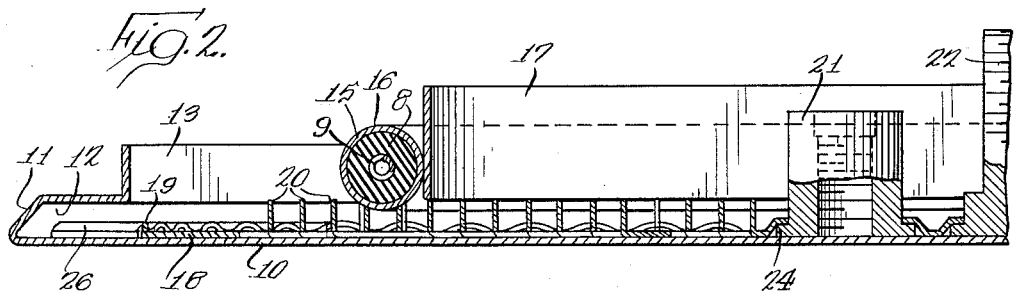
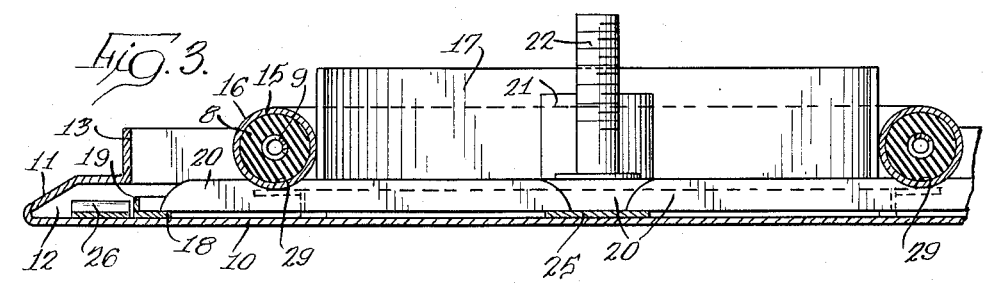
INVENTOR.
Ivar Jepson
BY
George R. Clark
Atty.

July 23, 1963 I. JEPSON 3,098,921
COMPOSITE ELECTRICALLY HEATED DEVICES
Filed July 10, 1957 2 Sheets-Sheet 2
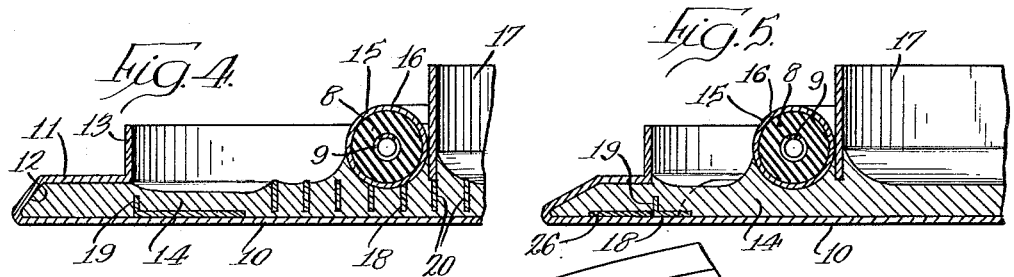
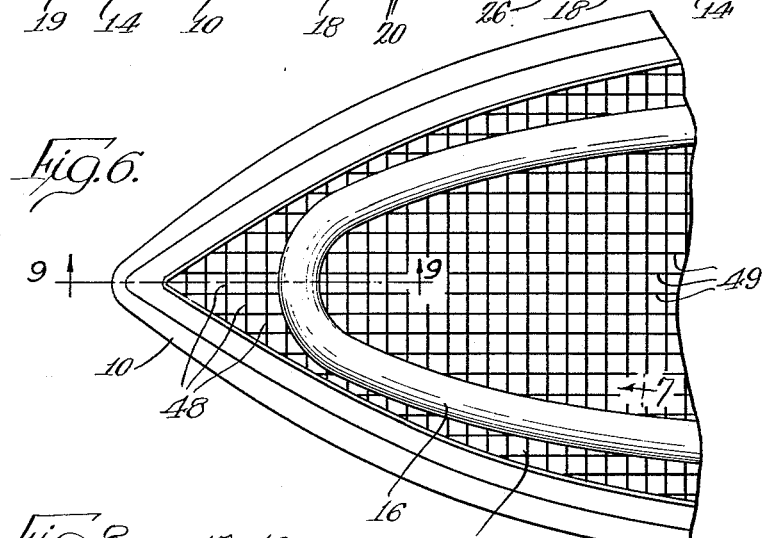
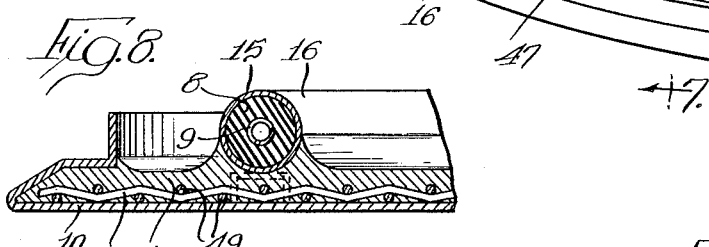
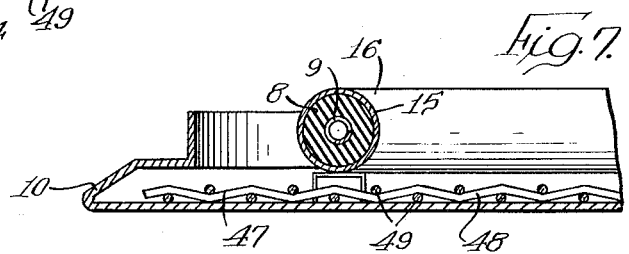
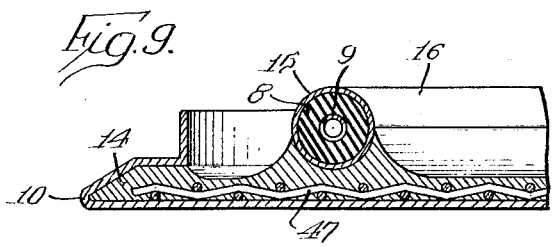
INVENTOR.
Ivar Jepson
BY
George R. Clark
Atty.

United States Patent Office 3,098,921
Patented July 23, 1963

3,098,921
COMPOSITE ELECTRICALLY HEATED DEVICES
Ivar Jepson, Oak Park, Ill., assignor to Sunbeam Corporation, Chicago, Ill., a corporation of Illinois
Filed July 10, 1957, Ser. No. 671,003
6 Claims. (Cl. 219—25)

This invention relates generally to composite electrically heated devices, and more particularly to lightweight composite sole plates of electric sadirons.

In an electric sadiron, it is desirable that the sole plate be light in weight, of high thermal conductivity, and have a hard scratchproof exterior surface. Present day sadirons usually include a sole plate and a sheathed electric heater in thermal contact with the upper portion of the sole plate. The lower surface of the sole plate is the work-engaging surface and the sole plate must conduct heat from the heater to that surface and distribute the heat uniformly over that surface. Prior art sole plates include those composed of aluminum having embedded therein the sheathed electric heaters, and such a sole plate is an excellent conductor of heat from the heater to the lower surface, but the aluminum being of soft metal, the exposed surfaces can be scratched relatively easily. When the sole plate is composed of a hard scratch-resistant metal such as steel or stainless steel, it is heavy and expensive in fabrication, and its heat conductive properties are not so good as in the case of aluminum. It has been proposed in the past to provide a sole plate having a thin steel or stainless steel outer shell or lower facing with a thicker backing layer of aluminum cast into the shell and forming a heat conductive layer. However, it is essential for good heat transfer that there be a close bond between the aluminum and the steel. Aluminum has a much higher coefficient of thermal expansion than steel, and it has been difficult to maintain a good bond between the steel facing and the backing layer after repeated heating and cooling as occurs in use of the sadiron.

The problem of obtaining and maintaining a good bond between the aluminum and steel has been solved by the construction disclosed and claimed in my co-pending application Serial No. 334,573, filed February 2, 1953, now Patent No. 2,807,700, for "Lightweight Composite Sole Plate and Method of Making the Same." The sole plate disclosed therein includes a thin steel bottom plate serving as a scratch-proof facing for a layer of aluminum cast on the upper face of the bottom plate and anchored thereto by a perforated steel anchor plate which is welded or brazed to the bottom plate and has anchoring portions spaced from the bottom plate for interlocking engagement with the cast aluminum. This construction provides lightness in weight, high thermal conductivity from the aluminum layer and a scratchproof steel exterior surface. However, heat transfer efficiency between two joined metals is much better where the metals are alloyed or metallurgically bonded together than with a very close mechanical bond, and there has been no economically feasible way of actually alloying aluminum and steel or stainless steel to form such a sole plate. Copper is a lightweight metal of high heat conductivity comparable to aluminum on a conductivity per unit of weight basis. Copper also will alloy with steel and stainless steel to form a metallurgical bond as distinguished from the mechanical bond between aluminum and steel or stainless steel where very limited alloying is present. Also, repeated heating and cooling of a composite structure of a thin steel or stainless steel facing and a heavier copper backing layer does not impair the alloyed bond between the facing and the backing layer. However, copper is much more expensive than aluminum, and in the past, it has been very difficult to spread molten copper over a controlled area while keeping the resulting layer of copper sufficiently thin that the cost thereof is not prohibitive. Thick layers of copper also have been formed on steel and stainless steel facings by electroplating the copper on the facing, but this forms a mechanical bond rather than an alloyed or metallurgical bond with less strength of the bond and also poorer heat transfer through the bond.

A similar problem exists in cooking vessels where it is desired to have a scratchproof interior facing and have a bottom of high thermal conductivity. There is a growing trend away from old style aluminum cookware to stainless steel because of the ease of cleaning and corrosion resistance as well as the scratch resistance of stainless steel. With the increase in the market for cooking vessels having self-containing heating units, such as the frypan described in United States Pat. No. 2,744,995 and the saucepan described in co-pending United States application, Serial No. 501,652, filed April 15, 1955, the need for a cooking vessel having both good scratch and corrosion resistance and having good thermal conductivity is more pressing than ever. The construction of a cooking vessel having a scratchproof interior and a heating element secured in good heat conducting relation to the bottom of the vessel presents substantially the same problems as have been discussed in connection with an electric iron sole plate above. Here again it has been difficult to spread a thin layer of copper over the bottom of the pan.

It is accordingly an object of the invention to provide new and improved electrically heated devices and methods of making the same.

Another object of the invention is to provide new and improved lightweight composite sole plates of electric sadirons and methods of making the same.

Yet another object of the invention is to provide an electrically heated device having a facing of a hard metal and a copper layer fused to one face thereof with a high melting point metal spreader embedded in the layer.

Still another object of the invention is to provide a method of making an electrically heated device in which a grill-like spreader of a high melting point metal is placed on a facing plate also of a high melting point metal and copper is melted on the spreader and travels along the spreader and the facing plate and cooled.

Another object of the invention is to provide an electrical heating device such as a sadiron, frypan, deep fat fryer or saucepan provided with a scratch resistant, corrosion resistant facing of steel or stainless steel and a high thermally conductive backing layer of copper alloyed to the facing to provide a bond of maximum strength and thermal conductivity and methods of making the same.

A further object of the invention is to provide a method of making a sadiron sole plate in which a steel spreader member having ribs extending thereacross is placed on the bottom of a stainless steel shell, copper is melted while in contact with the member and is spread by the member over the bottom of the shell and the copper is cooled.

A still further object of the invention is to provide a method of making a sadiron sole plate in which a steel screen sheet is placed on one face of a steel facing shell, a sheathed heater is placed on the screen, and copper is melted and solidified to fuse to the screen sheet, the heater and the shell.

Other objects and features of the invention will become apparent from the following detailed description of electric heating devices and methods of making the same, when read in conjunction with the appended drawings, in which:

FIG. 1 is a top plan view of a sadiron sole plate forming one embodiment of the invention during one stage of its manufacture and made by a method forming one embodiment of the invention;

FIG. 2 is an enlarged fragmentary vertical section taken along line 2—2 of FIG. 1;

FIG. 3 is an enlarged fragmentary vertical section taken along line 3—3 of FIG. 1;

FIGS. 4 and 5 are views similar to FIGS. 2 and 3, respectively, of the completed sole plate;

FIG. 6 is a fragmentary top plan view of a sadiron sole plate forming an alternate embodiment of the invention during one state of its construction;

FIG. 7 is an enlarged vertical section of the sole plate shown in FIG. 6 during one stage of its construction, said section being taken along line 7—7 of FIG. 6;

FIG. 8 is an enlarged, fragmentary, vertical section similar to FIG. 7 of the completed sole plate; and FIG. 9 is an enlarged fragmentary vertical section taken along line 9—9 of FIG. 6.

The invention provides an electrically heated device and methods of manufacturing the same having a facing sheet of hard metal such as steel or the like and a backing layer of copper fused or alloyed to one side of the facing sheet and also fused or alloyed to the sheath of a resistance heating element. A grill-like spreader of hard metal such as steel or a wire screen of steel or the like extends along one face of the facing sheet and is embedded in the backing layer. The spreader includes a large number of filaments or webs and may be of expanded metal or a screen. In one method embodying the invention, the spreader is placed on the top surface of the facing sheet, the sheathed resistance heating element is placed on the spreader, and copper is melted while in contact with the spreader. The copper travels along all portions of the spreader to completely cover the facing sheet, and also wets the sheath of the heater. The assemblage is cooled to fuse to the facing sheet, the spreader and the sheath. The resulting device has a hard facing covered by the copper layer of high thermal conductivity spread completely over one face thereof by the spreader and reinforced by the spreader. The copper layer also is in intimate thermal conductive relationship with the sheath of the heating element. There also may be provided a steel stiffening web extending along the heating element and bonded to the element and the spreader by the copper layer.

In FIGS. 1 through 5, there is shown a sadiron sole plate provided with a facing sheet 10 of a hard, impervious, scratchproof metal in the form of a shell having turned edge portions 11 forming a peripheral recess 12 and also provided with an upper flange or rim 13. Since the sheet 10 comprises the work engaging portion of the sole plate, it is desirable to fabricate it of a scratch-resistant material. The sheet 10 is composed of a hard, scratchproof, high melting point metal preferably of steel or stainless steel, and in one constructed embodiment of the invention, was of cold rolled steel one thirty-second of an inch in thickness, the recess 12 being of a width of about four-tenths of an inch and a height of about one-eighth of an inch.

Since steel and particularly stainless steel is a relatively poor heat conductor, it is necessary to provide a good heat conducting backing for the facing sheet 10 so that the entire surface can be heated uniformly from a line type of heat source. To accomplish this function, copper backing layer 14 (FIGS. 4 and 5) covers and is alloyed or metallurgically bonded to the top surface of the sheet 10. The layer 14 covers the entire surface of sheet 10 extending into the recess 12, and is alloyed to an elongated U-shaped heating element 16 which may take the form of a sheathed heating element. This type of heater conventionally has a steel sheath 15 surrounding insulation 8 in which a resistance wire 9 is embedded. The heater 16 is of a known type and all its elements having melting points substantially higher than that of copper. The copper also is alloyed to a stiffening web 17 of steel and a steel grill-like spreader 18 embedded in the copper. The backing layer 14 is sufficiently thick to provide excellent heat distribution and preferably is at least one-eighth of an inch in thickness.

The spreader 18 is provided for the purpose of distributing the copper uniformly over the upper face of the facing sheet 10 during the brazing operation. The spreader spreads the copper in a layer thin enough that the cost of the copper is not prohibitive and prevents formation of widely different thicknesses of the copper on different portions of the sheet 10, thereby providing uniform heat transfer characteristics between the copper backing layer and the stainless steel facing sheet 10 over the entire upper face of the sheet 10. The spreader 18 is preferably composed of carbon sheet steel, as distinguished from stainless steel, and has a peripheral flange 19 adjacent to the peripheral flange 13 of the sheet 10. The spreader also has webs or filaments 20 cut from the sheet steel along their edges and twisted into vertical planes. The lower edges of the webs 20 are spaced above the upper face of the sheet 10 a distance about the thickness of the sheet forming the spreader, which was 1/64 of an inch in one constructed embodiment of the invention. This spacing permits molten copper to flow thereunder so as to be in intimate contact with the sheet 10 and makes the layer of copper continuous for excellent thermal transfer along the sheet 10.

To attach a handle and a cover (not shown) to the sole plate, a flanged steel boss or socket 21 is welded to an unslit portion 23 of the spreader before the spreader is placed on the sheet 10. To provide a mounting for the control thermostat of the iron (not shown) which is in good thermal conducting relation to the sole plate, a mounting lug 22 is secured to the upper surface of the sole plate. The spreader sheet 18, to which the mounting lug 22 is welded, has the unslit portion 23 located centrally of the sole plate. The portion 23 lies between the webs 20 and permits the lug 22 to be welded securely to the sole plate so that it will provide a good conducting path to the thermostat to be mounted thereon. The ends of the socket 21 and lug 22 nest in drawn sockets 24 in the portion 23. The boss 21 and the lug 22 may be welded, brazed or mechanically secured to the sockets 24 of the portion 23 of the spreader 18. Or, alternately, the boss 21 and lug 22 may pass loosely through the sockets 24 and be welded or brazed directly to the facing sheet 10 prior to the copper brazing operation. The webs 20 have notches 29 (FIG. 3) therein to nest the heater 16 and are joined by central unslit portions 25. Corrugated edge strips 26 of steel may be provided in the recess 12 to aid in spreading the copper into the recess 12.

In the manufacture of the sole plate shown in FIGS. 1 through 5, the sheet 10 is formed by overturning the flanges 11 and 13 and brazing along joints 31 and 32 in a known manner with brazing metal having a melting point substantially higher than that of copper. The spreader 18 is formed by slitting, drawing and forming. The spreading strips 26 are placed in the recess 12. The socket 21 and stud 22 are brazed to the spreader 18, and the spreader is placed in the facing sheet 10 and preferably is brazed to the sheet 10 at spaced points. Then the web 17 and the heater 16 are placed on the spreader, and copper in divided form is spread over the spreader. Alternately, if desired, the copper may be in the form of a sheet which is placed on the facing sheet 10 in a position covering substantially the entire upper face of the sheet 10 and then the spreader 18 and strips 26 are placed on the copper sheet. The resulting assemblage then is placed in an inert or slightly reducing atmosphere and is heated to a temperature just sufficient to liquify the copper and not high enough to melt any of the other elements. The copper flows along the spreader and the sheet 10, into the recess 12, around the lower portion of the sheath 15 of the heater 16 and around the lower edge of the web 17 and thoroughly wets and alloys with these elements. After this, the assemblage is cooled to fuse and alloy the copper to the elements it wets, and the sheet 10 is chromium plated, if of carbon steel, or polished if of stainless steel.

The sadiron sole plate shown in FIGS. 6 through 9 is generally similar to that described above and shown in FIGS. 1 through 5, and includes a steel facing sheet 10 having a copper layer 14 fused thereto and to a heater 16. The layer 14 is spread over the sheet 10 by a screen spreader 47 of steel wires 48 and 49 woven together. The spreader 47 spreads the copper when it is molten during fabrication of the sole plate, and, in one constructed embodiment of the invention, was formed of one-eighth inch mesh of eighteen gauge steel wires. The copper layer 14 was about one-eighth of an inch thick in this constructed embodiment, and the sheet 10 was 1/32 of an inch thick.

The sole plates constructed by the methods described above are light in weight and each has a hard, impervious, corrosion resistant facing of a metal of somewhat low thermal conductivity to which heat is effectively distributed by the copper layer alloyed to the entire face thereof and also alloyed to the sheath of the electric heater. Thus, the sole plate combines a scratch resistant, corrosion resistant exterior facing with a backing layer of high thermal conductivity spread uniformly over and alloyed with the entire face of the exterior facing.

While the above-described embodiments of the invention are sadiron sole plates, it is obvious that the other heated devices such as, for example, an electric frying pan, can be so constructed. Such a frying pan has a steel or stainless steel shell having a backing layer of copper alloyed to the exterior of the bottom thereof and spread thereover by a grill-like spreader, and also bonded to a sheathed, looped resistance heater and to a steel housing for a thermostatic element.

Obviously, many other devices and methods may utilize the principles of the invention as defined in the appended claims.

What is claimed as new and desired to be secured by Letters Patent of the United States is:

1. In an electrically heated device, a facing sheet of steel, a spreader element of steel mounted on one face of said sheet and being substantially coextensive with said sheet, said element including a plurality of filaments comprising portions raised out of plane of said element so as to be spaced from said sheet extending substantially parallel to said sheet, an electrically insulated resistance heater extending along said element and being disposed entirely on one side of said element, and a layer of copper fused to said face of said sheet and embedding at least portions of said element and said heater therein.

2. In an electrically heated device, a plate of steel, a spreader of sheet steel having a peripheral portion in contact with one face of said plate and having webs transverse to said plate extending across said plate, said webs having aligned arcuate notches therein, an electrically insulated and metallic sheathed resistance heater resting on said webs in said notches, recesses in said spreader between said webs, and a layer of copper extending over and fused to said face of said plate and filling said recesses, said layer of copper at least partially embedding and being fused to said webs and said heater.

3. In a composite lightweight sole plate for a sadiron, a shell of steel having a flat bottom portion and top flange portion extending upwardly and inwardly from the outer edge thereof to define a peripheral recess, a spreader of steel having a plurality of filaments spaced from one another and substantially covering the upper face of said bottom portion of said shell, a layer of copper secured to the upper face of said bottom of said shell and embedding asid spreader therein, said layer also filling said peripheral recess, and an insulated resistance heating element at least partially embedded in said layer.

4. In a composite lightweight sole plate for a sadiron, a shell of steel having a flat bottom portion and top flange portion extending upwardly and inwardly from the outer edge thereof to define a peripheral recess; a spreader of woven steel wire having a plurality of filaments spaced from one another and substantially covering the upper face of said bottom portion of said shell; a layer of copper secured to the upper face of said bottom of said shell and embedding said spreader therein; said layer also filling said peripheral recess; and an insulated resistance heating element extending along the upper face of said spreader and at least partially embedded in said layer.

5. In an electrically heated device, a plate of steel having an upturned flange forming a peripheral recess, a spreader of sheet steel having a peripheral portion in contact with one face of said plate and having webs transverse to said plate extending across said plate and spaced from said plate, an electrically insulated and metallic sheathed resistance heater resting on said webs, and a layer of copper extending over and fused to said face of said plate, said layer also filling said recess and at least partially embedding and fused to said webs and said heater.

6. In an electrically heated device: a metallic plate of relatively poor thermal conductivity; a metallic spreader member formed of criss-crossing wires positioned over one side of said metallic plate, at least portions of said wires being spaced from said plate; a metallic sheathed heating element positioned over said spreader member; said plate, foraminous member and heating element sheath being made of metallic material readily wet by a brazing metal when applied in a molten state; and a layer of a brazing metal having high heat conductivity applied to said plate and said spreader member and embedding at least portions of said spreader member and said heating element therein.

References Cited in the file of this patent

UNITED STATES PATENTS

| | | |
|---|---|---|
| 1,243,654 | Clark | Oct. 16, 1917 |
| 1,254,558 | Zeitler | Jan. 22, 1918 |
| 1,257,106 | Parkhurst | Feb. 19, 1918 |
| 1,547,837 | Steenstrup | July 28, 1925 |
| 2,257,451 | Barnes | Sept. 30, 1941 |
| 2,357,578 | Brownback | Sept. 5, 1944 |
| 2,552,818 | Russell | May 15, 1951 |
| 2,579,898 | Brucker | Dec. 25, 1951 |
| 2,671,950 | Sukacey | Mar. 16, 1954 |
| 2,677,172 | Oakley | May 4, 1954 |
| 2,807,700 | Jepson | Sept. 24, 1957 |

FOREIGN PATENTS

| | | |
|---|---|---|
| 109,512 | Australia | Jan. 18, 1940 |